(12) United States Patent
Plut

(10) Patent No.: US 8,585,213 B2
(45) Date of Patent: Nov. 19, 2013

(54) PROJECTION-TYPE DISPLAY AND CONTROL THEREOF

(75) Inventor: William J. Plut, Los Altos, CA (US)

(73) Assignee: Transpacific Image, LLC, Wilmington, DE (US)

( * ) Notice: Subject to any disclaimer, the term of this patent is extended or adjusted under 35 U.S.C. 154(b) by 832 days.

(21) Appl. No.: 12/473,704

(22) Filed: May 28, 2009

(65) Prior Publication Data

US 2010/0302515 A1 Dec. 2, 2010

(51) Int. Cl.
*G03B 21/00* (2006.01)
*G03B 21/20* (2006.01)
*G01J 1/32* (2006.01)
*H05B 37/02* (2006.01)
*H05B 39/04* (2006.01)
*H05B 41/36* (2006.01)

(52) U.S. Cl.
USPC .............. 353/85; 353/122; 315/149; 250/205

(58) Field of Classification Search
USPC ........ 353/31, 69, 85, 122; 362/191, 602–603,
362/655, 657, 744; 345/39, 55;
315/149–151, 156–159; 250/205,
250/214 R, 214.1, 221; 348/191, 602–603,
348/655, 657, 744
See application file for complete search history.

(56) References Cited

U.S. PATENT DOCUMENTS

| | | | | |
|---|---|---|---|---|
| 5,036,189 A | * | 7/1991 | Geller | 250/205 |
| 5,502,298 A | * | 3/1996 | Geller | 250/205 |
| 5,806,055 A | * | 9/1998 | Zinda, Jr. | 706/45 |
| 6,157,143 A | * | 12/2000 | Bigio et al. | 315/307 |
| 6,252,355 B1 | * | 6/2001 | Meldrum et al. | 315/150 |
| 7,019,736 B2 | * | 3/2006 | Allen et al. | 345/207 |
| 7,460,179 B2 | * | 12/2008 | Pate et al. | 348/602 |

(Continued)

FOREIGN PATENT DOCUMENTS

EP 1465437 A2 10/2004
EP 1981286 A2 10/2008

(Continued)

OTHER PUBLICATIONS

International Search Report and Written Opinion for International Application No. PCT/US2010/029949 dated Sep. 23, 2010, 28 pages.

(Continued)

*Primary Examiner* — Tony Ko
*Assistant Examiner* — Jori S Reilly-Diakun
(74) *Attorney, Agent, or Firm* — Turocy & Watson, LLP

(57) ABSTRACT

A projection display device that includes a set of light source units (e.g., lasers or LEDs) and a control mechanism that monitors performance of each of the units, as well as external factors, e.g., time, ambient temperature, etc. is provided. The control mechanism may dynamically adjust each light source unit, for example, to maximize longevity. In operation, an optical modulator is configured to selectively transmit light produced by a subset of the light source units according to video data included in a video signal provided to the projection-type display device. A projection lens system is configured to project light transmitted by the optical modulator along a projection path. A sensor detects real time readings related to the performance of the set of light source units. In accordance with the readings, a control circuitry dynamically controls the laser set to dynamically vary the luminance of the set of light source units.

25 Claims, 11 Drawing Sheets

(56) References Cited

U.S. PATENT DOCUMENTS

| | | | |
|---|---|---|---|
| 7,508,144 B2* | 3/2009 | Yamauchi et al. | 315/291 |
| 7,542,055 B2* | 6/2009 | Matsuda et al. | 345/690 |
| 8,083,356 B2* | 12/2011 | Chung | 353/57 |
| 2002/0024612 A1* | 2/2002 | Gyoten | 348/383 |
| 2003/0020884 A1* | 1/2003 | Okada et al. | 353/57 |
| 2004/0239880 A1 | 12/2004 | Kapellner | |
| 2004/0239887 A1* | 12/2004 | Yasuda | 353/57 |
| 2005/0041000 A1 | 2/2005 | Plut | |
| 2005/0128441 A1 | 6/2005 | Morgan | |
| 2005/0179637 A1 | 8/2005 | Iisaka | |
| 2005/0231693 A1* | 10/2005 | Seki et al. | 353/99 |
| 2006/0002109 A1 | 1/2006 | Imade | |
| 2006/0215122 A1 | 9/2006 | Hong | |
| 2007/0013871 A1 | 1/2007 | Marshall | |
| 2007/0103646 A1* | 5/2007 | Young | 353/52 |
| 2008/0042578 A1* | 2/2008 | Arai et al. | 315/32 |
| 2008/0246715 A1 | 10/2008 | Nagase | |
| 2009/0128451 A1 | 5/2009 | Tokui | |
| 2009/0147224 A1* | 6/2009 | Kurozuka et al. | 353/98 |
| 2009/0224136 A1* | 9/2009 | Ikegami | 250/205 |

FOREIGN PATENT DOCUMENTS

| | | |
|---|---|---|
| JP | 2008102442 A | 5/2008 |
| JP | 2008-193054 | 8/2008 |
| WO | 2009032341 A1 | 3/2009 |

OTHER PUBLICATIONS

Japanese Office Action mailed Aug. 28, 2013 for Japanese Patent Application No. 2012-513074, 3 pages.

Korean Office Action mailed Jun. 19, 2013 for Korean Patent Application No. 10-2011-7031403, 7 pages.

* cited by examiner

PROJECTION-TYPE DISPLAY AND CONTROL THEREOF

BACKGROUND

In general, a projection-type display or video projector displays an image that corresponds to a video signal upon a projection screen or other surface. Most modern devices are capable of correcting distortion, curves, focus, and other inconsistencies by way of manual controls. Traditionally, these video projection devices are widely used for business presentations, classroom training, home theater, etc. For example, projection devices are widely used in many schools and institutions to project onto an interactive white board during the course of teaching students.

Although projection-type display devices were initially developed to display presentations (e.g., business, education), today, these projection devices have become commonplace for home theaters. For example, many households today include home theaters specifically designed to view motion pictures upon a projection screen. These theaters are often equipped with a projection-type display device. Even though the cost of the devices has decreased to an affordable level, at least one difficulty remains with regard to consumer acceptance of the projection display device. This one reservation is that the projection bulbs typically used in projector are expensive lamps that have huge power consumption and a generally short life span. Thus, while the cost of the machine is affordable, maintenance is sometimes too expensive for many families to justify or afford.

DETAILED DESCRIPTION

Figure 1:
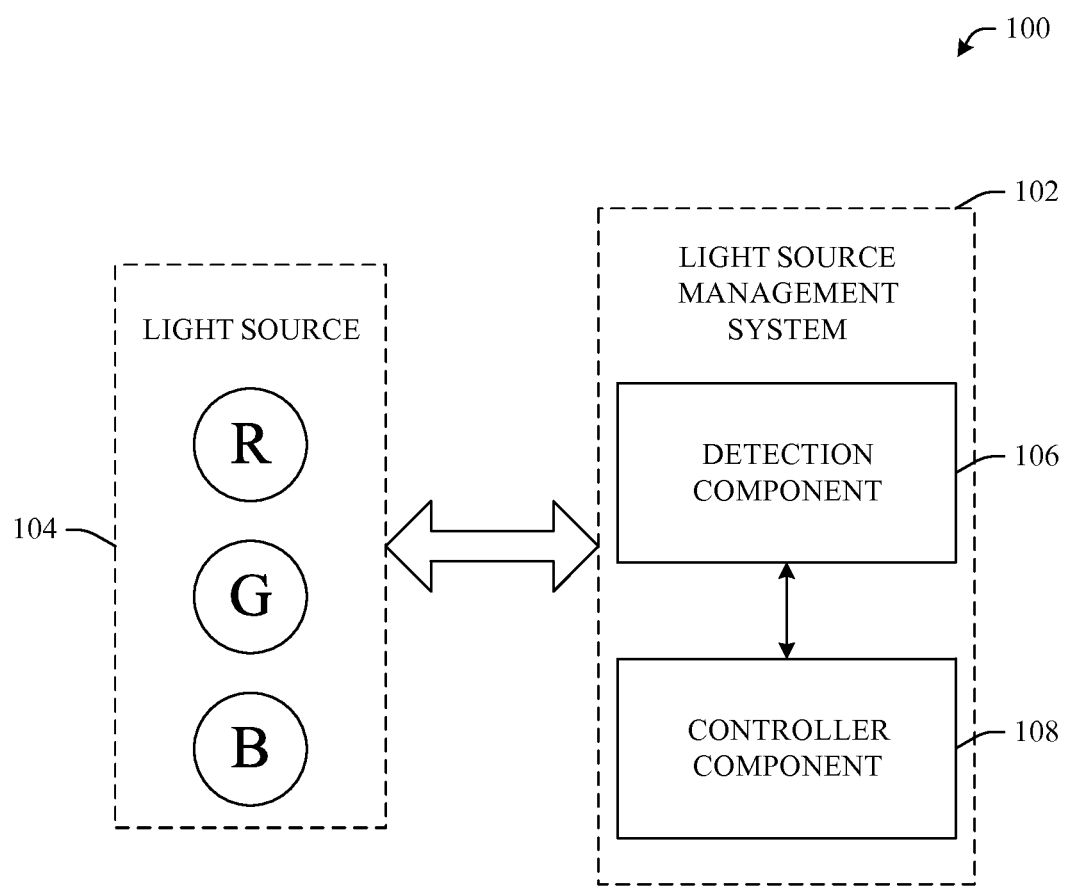
FIG. 1 illustrates an example block diagram of a system that facilitates dynamic adjustment of a light source of a projection-type display device.

The following terms are used throughout the description, the definitions of which are provided herein to assist in understanding various aspects of the subject innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation may be practiced without these specific details. In other instances, well-known structures and devices are shown in block diagram form in order to facilitate describing the innovation.

As used in this application, the terms "component," "module" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution, and a component may be localized on one computer and/or distributed between two or more computers.

The innovation disclosed and claimed herein, in one aspect thereof, comprises a projection-type display device capable of real time (or near real time) dynamic adjustment. A light source management system may be employed that monitors criteria associated to the light source of the display device. In accordance with captured criteria, a controller component or circuitry may dynamically adjust a subset of the light source.

In embodiments of the subject innovation, a detection component (e.g., sensor) may monitor an image projected by a light source. Luminance of the light source may be compared to a threshold in order to determine if adjustment is appropriate. For instance, if the luminance exceeds a threshold, the light source may be reduced in power. Similarly, if the luminance is below a predetermined threshold, the power may be increased accordingly.

In yet other embodiments of the subject innovation, temperature of each of the components of a light source may be monitored. Similar to the above example, the temperature criteria may be compared to a threshold. Here, if the temperature exceeds a threshold, the individual light source component may be toggled or switched off. Similarly, an individual light source may be toggled or switched on as a function of temperature.

In accordance with the innovation, performance criteria (e.g., luminance, temperature) may be captured in real time (or near real time) enabling dynamic adjustment of the projection light source. It will be understood that this dynamic adjustment may increase longevity of the light source thereby decreasing operating costs associated with a projection-type display device.

Referring initially to the drawings, FIG. 1 illustrates a system 100 that facilitates dynamic adjustment of a light source in accordance with aspects of the innovation. As shown, the system 100 may include a light source management system 102 that is capable of monitoring and automatically adjusting a light source 104. For example, based upon the temperature of each laser in a set of red, green and blue lasers, the light source management system 102 may dynamically, e.g., in real time or near real time, adjust luminance of a subset of the lasers in a light source. Alternatively, the light source management system 102 can dynamically adjust one or more light emitting diodes (LEDs) of a set of LEDs based upon one or more parameters being monitored. In this regard, any of the embodiments described herein in the context of lasers, or diode lasers, can also be applied to LEDs, or vice versa. Moreover, embodiments presented in the context of lasers or LEDs are equally applicable to monitoring and adjusting a combination of lasers and LEDs as the light source 104. It is noted, however, that parameters such as temperature drift and longevity tend to be more of an issue for lasers than for LEDs. Accordingly, selected parameters can be changed according to whether LEDs and/or lasers are involved in any given embodiment. Additionally, based upon laser performance criteria gathered, the light source management component 102 may toggle lasers or LEDs on or off as appropriate so as to enhance life or longevity of the laser devices.

Generally, light source management component 102 may include a detection component 106 and a controller component 108. Together, these components (106, 108) are capable of establishing characteristics related to each of the lasers and comprehensively making adjustments to the set of lasers employed within the light source 104. The features, functions and benefits of the light source management system 102 as well as its sub-components (106, 108) will be described in greater detail infra.

Figure 2:
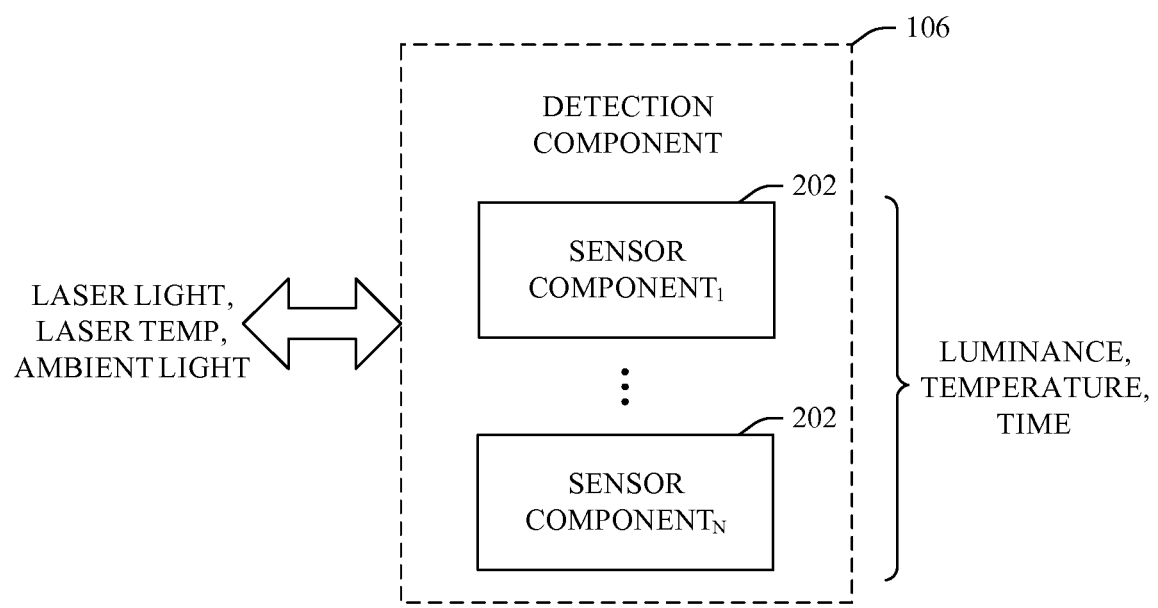
FIG. 2 illustrates an example block diagram of a detection component in accordance with aspects of the innovation.

FIG. 2 illustrates an example detection component 106 in accordance with aspects of the innovation. Generally, the detection component 106 may include 1 to N sensor components 202, where N is an integer. By way of example, the sensor component 202 may detect luminance of each of the lasers in real time as an image is projected. In accordance therewith, the controller component 108 may switch lasers on or off as deemed appropriate based upon the luminance.

In other aspects, the sensor component 202 may monitor temperature of each of the lasers (or LEDs). It will be appreciated that longevity of the lasers (or light sources) may be affected by extended use at high temperatures. Thus, in accordance with the temperature reading established, the controller component 108 may switch appropriate light sources on or off to avoid or minimize extended use of individual lasers at high temperatures so as to enhance longevity and performance of the sources within the projection-type device.

In yet another aspect, the sensor component 202 may monitor ambient light with the environment of a projected image. Here, as appropriate, luminance may be increased or decreased in each of the lasers of the light source 104 so as to optimize or otherwise enhance performance. Similarly, lasers may be toggled on or off as appropriate.

Figure 3:
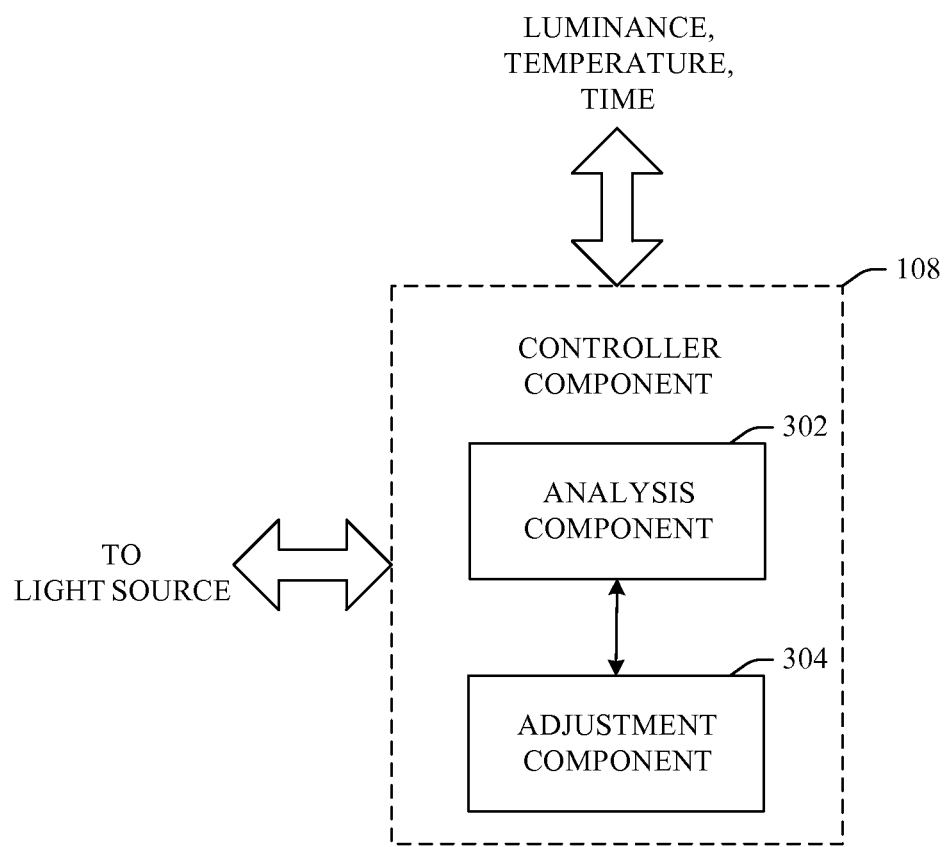
FIG. 3 illustrates an example block diagram of a controller component in accordance with aspects of the innovation.

Turning now to FIG. 3, a block diagram of an example controller component 108 is shown in accordance with aspects of the innovation. Generally, the controller component 108 (e.g., control circuitry) may include an analysis component 302 and an adjustment component 304. Together, these sub-components (302, 304) may process real time (or near real time) readings from the detection component 106 to ultimately manage operation of each of the lasers (or LEDs) within a light source 104.

In operation, the analysis component 302 may evaluate the information and criteria received from the detection component 106. For instance, the information may be compared against a threshold or limit. It is to be understood that the threshold or limit may be based upon predefined criteria established by a user or manufacturer. In other aspects, the threshold may dynamically shift based upon environmental factors (e.g., ambient light, temperature) as well as the scope of use.

The adjustment component 304 may be used to automatically regulate use of each of the lasers. Similarly, the adjustment component 304 may dynamically calibrate luminescence (or other parameters) of each of the lasers, for example, to optimize visual representation of an image. In addition to regulating or calibrating luminance, the adjustment component 304 is also capable of toggling all or a subset of the lasers on or off as appropriate. It is to be understood and appreciated that "luminance" may refer to a measure of the brightness of a surface, equal to the amount of luminous flux arriving at, passing through, or leaving a unit area of surface. Further, luminance is most often measured in candelas per square meter.

Figure 4:
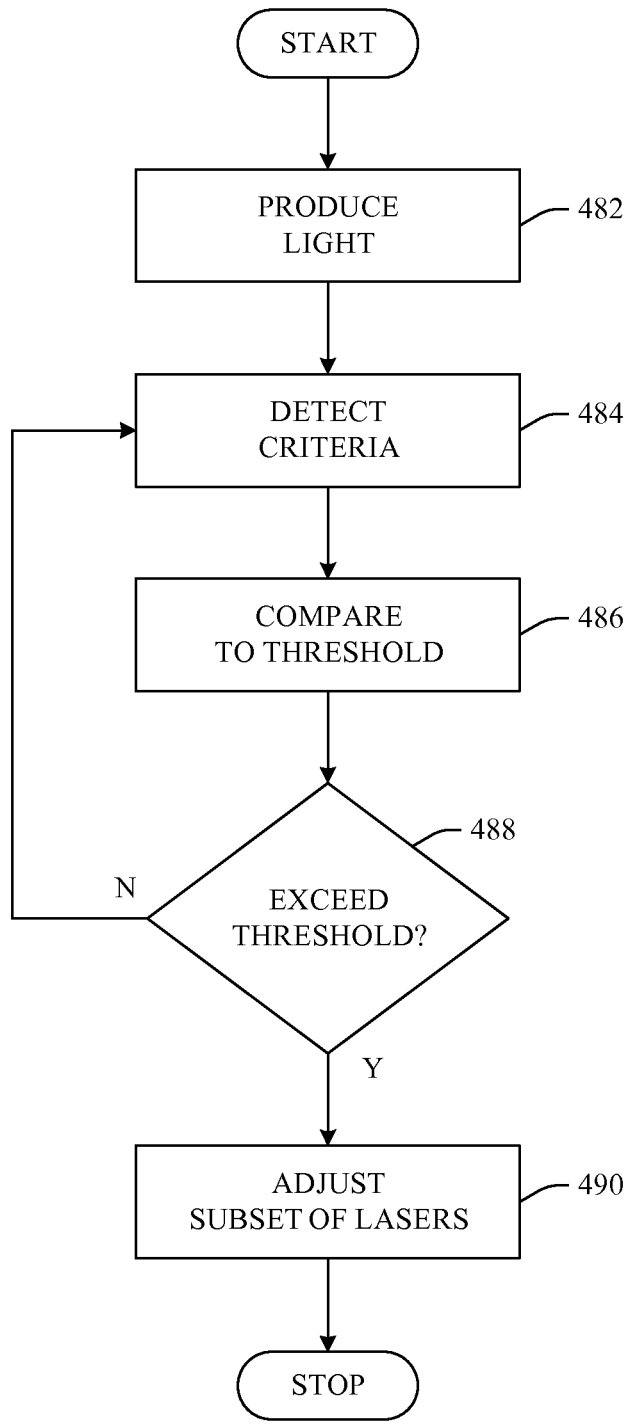
FIG. 4 illustrates an example flow chart of procedures that facilitate dynamic adjustment of a light source in accordance with aspects of the innovation.

FIG. 4 illustrates a methodology of dynamically controlling lasers and/or LEDs within a projection device in accordance with aspects of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 482, light is produced, for example, a set of lasers is used to generate light. Criteria related to at least either, or both, the image generated by the set of lasers or to each of the lasers themselves, at 484. For example, luminance of the image is captured. Video data may also be captured. In another example, the temperature of each laser is captured. In still another aspect, ambient light is measured. Light produced by a laser or set of lasers (e.g., the red lasers in a set) may also be detected. Once the criteria are collected, it is compared to a threshold at 486.

A determination is made to establish if the criteria exceeds a threshold at 488. As stated above, the threshold may be predefined or otherwise related to other parameters. For example, the threshold of an acceptable laser temperature may be a function of lifecycle testing for the laser. In other words, the laser may have certain temperature thresholds above which failure is more likely to occur, or temperature thresholds above which longevity failures due to prolonged use at the elevated temperature are more likely. If it is determined that the threshold is not exceeded by the captured criteria, the methodology returns to 484 to monitor real time criteria.

If, on the other hand, it is determined that the threshold is exceeded, the lasers may be adjusted at 490. In other words, in aspects, a subset of the lasers may be toggled on or off in accordance with the comparison. It is to be understood that most any adjustment of the lasers may be performed in response to the captured criteria as appropriate or desired.

Figure 5:
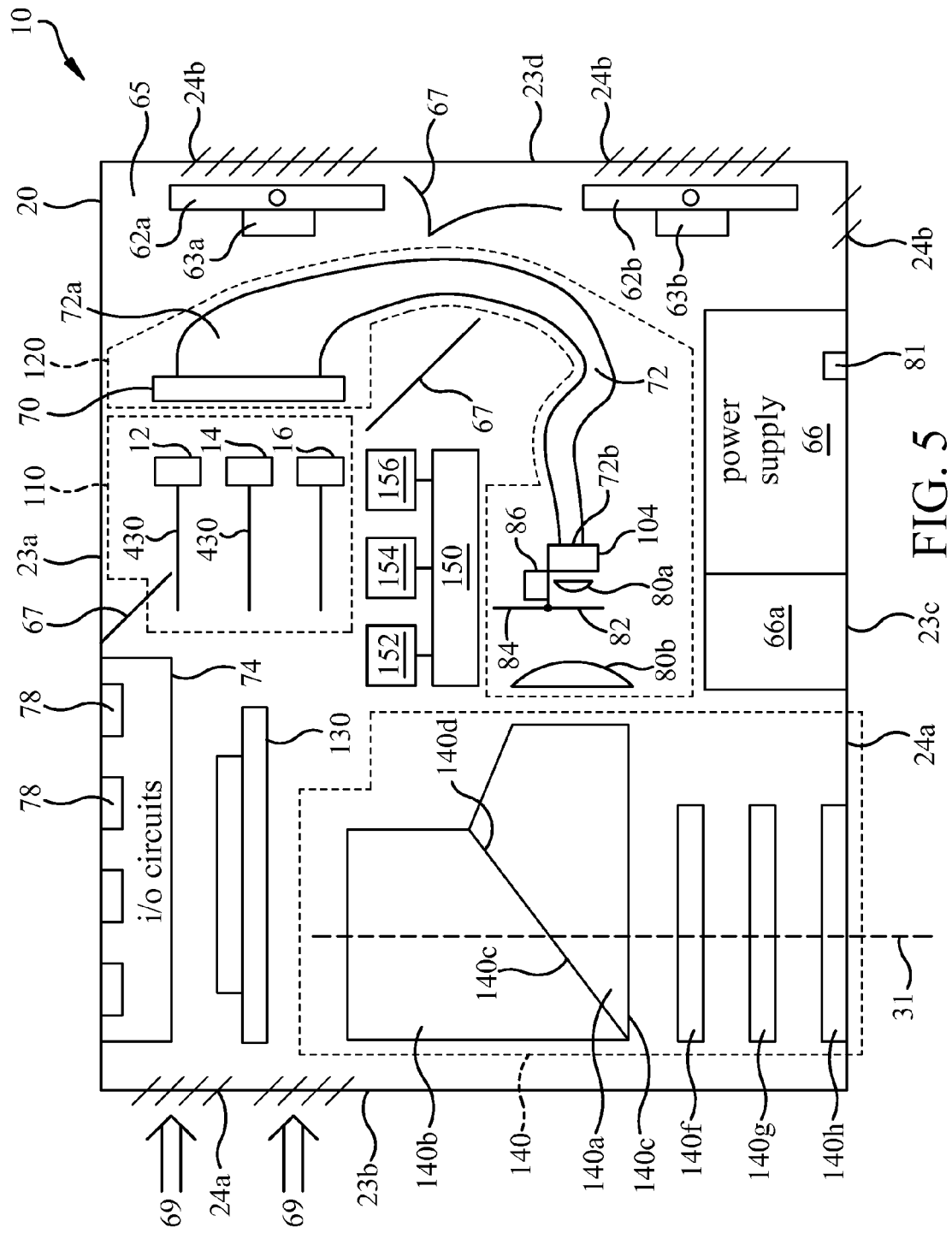
FIG. 5 illustrates an example schematic of projection-type display device in accordance with aspects of the innovation.

FIG. 5 illustrates an example block diagram of a projection-type display device 10 in accordance with embodiments of the innovation. Display device 10 is configured to produce and project a video image for display upon a receiving surface. As shown, display device 10 comprises light source 110, optical system 120, optical modulator 130, projection lens system 140, control circuitry 150, luminance sensor 152, housing 20, fans 62, power supply 66, input/output circuitry 74, and input/output interfaces 78. The light source 110 is capable of producing a desired amount of light. In embodiments, the light source 110 is a set of lasers, wherein each laser diode in the set may be individually switched off or on.

In the example, the light source 110 uses a red laser set 12, a green laser set 14 and a blue laser set 16, one set for each primary color, though, as mentioned, alternate embodiments can substitute LEDs for lasers, and vice versa. The optical system 120 is arranged to receive light produced by the light source before receipt by the optical modulator 130, and configured to increase flux area of the light. The optical modulator 130 configured to selectively transmit light produced by the set of lasers according to video data included in a video signal provided to the projection-type display device. Projection lens system 140 comprises prism structure and lens set. As described supra, the luminance sensor 152 detects a real time (or near real time) reading measuring an image projected by the projection-type display device. In response thereto, the control circuitry 150 dynamically controls the light source 110 based on the real time readings to dynamically vary the luminance of a subset of the set of lasers.

Housing 20 defines outer dimensions of the display device 10 and a chamber 65 within display device 10. Housing 20 also provides mechanical protection for internal components of display device 10. As shown, housing 20 comprises four walls 23a-23d, a top wall (not shown), and a bottom wall (not shown). Walls define a chamber 65 within housing 20. Walls 23a-23d comprise a suitably stiff or rigid material that grants structural rigidity for display device 10 and mechanical protection for internal components within housing 20, such as a metal or molded plastic. One or more walls 23a-d of housing 20 may also include an air vent that permits airflow between chamber 65 and an environment external to housing 50. Vents may also be placed on the top and bottom walls of housing 20.

Power supply 66 provides electrical power to red laser set 12, green laser set 14, and blue laser set 16 and other components within display device 10 that consume electrical power. Thus, power supply 66 may provide electrical energy to control circuitry 150, input/output circuitry 74, fans and optical modulator 130. A power cord port 81 receives a power cord, which couples power supply 66 to an AC power source such as a wall power supply. In embodiments, conversion of AC power to DC power occurs in a transformer included between ends of the power cord thereby reducing the size of power supply 66 and display device 10 and increasing the portability of display device 10.

In other embodiments, power supply 66 comprises at least one battery 66a. The battery 66a may be a rechargeable battery and be recharged using power provided through power cord port 81. Battery 66a allows display device 10 to operate on stored energy and without reliance on proximity to an AC power source, which further increases portability of display device 10. For example, inclusion of a battery in housing 20 extends display device 10 usage to settings where AC and fixed power outlets are not available or within reach.

Lasers as described herein, such as those included in red laser set 12, green laser set 14 and blue laser set 16, produce laser light having a wavelength between about 400 nanometers and about 700 nanometers, which is generally accepted as the visible spectrum. It is to be understood that more or less lasers of the same or different color may be employed in alternative aspects. Laser light refers to light that is generated using a lasing mechanism, which in some cases may be manipulated after initial generation to achieve a desired frequency, as will be described in further detail below. In the example, red laser set 12, green laser set 14, and blue laser set 16 respectively produces red, green and blue laser light to be used as light source of the display device 10. In some other embodiments, as mentioned, LEDs are also capable of being adopted as the light source separate from or in combination with lasers.

In embodiments, each laser emits substantially collimated light. Collimated light differs from radiant light (e.g., from a lamp or light emitting diode) and is characterized by light that travels in about the same direction. Laser light emitted from each laser may also be characterized as coherent. The coherency of laser light relates to the constancy of the spatial and temporal variations in the light or radiation wave fronts. A high degree of coherence implies a substantially constant phase difference between two points on a series of about equal amplitude wave fronts (spatial coherence); and a correlation in time between the same points on differently wave fronts (temporal coherence). If a laser beam is considered as a plane wave traveling in one direction, it is spatially coherent due to the perpendicularity of wave fronts in the direction of propagation. Also, due to the roughly monochromatic nature of laser light emitted from lasers as described herein, the beam is generally temporally coherent, that is, it will display an about fixed phase relation between a portion of the beam emitted at one time and a portion emitted at another.

Control circuitry 150 provides control signals to components within display device 10, and may route data from input/output circuitry 74 to appropriate components within display device 10. Thus, lasers in red laser set 12, green laser set 14 and blue laser set 16 receive control signals from control circuitry 150 that regulates each laser when each laser is turned on/off. More specifically, control circuitry 150 receives video data included in a signal via one or more input/output interfaces 78 and input/output circuitry 74, converts the video data to pixel data on a sequential color frame basis, and delivers the sequential color pixel data to the optical modulator 130 and to each diode laser. In a combined light transmission path design between sets of lasers and optical modulator 130 where light is transmitted along a common light path that transmits red, green and blue light in a sequential red, green and blue order, control circuitry 150 synchronizes the timing of colored data sent to optical modulator 130 and on/off commands sent to red laser set 12, green laser set 14 and blue laser set 16 respectively.

Controller component or control circuitry 150 may also include and access memory that stores instructions for the operation of components within display device 10. For example, stored heat regulation instructions may specify control signals sent by control circuitry 150 to fans. As described above, one or more temperature sensors may also be disposed within housing 20 to facilitate thermal regulation. For example, a temperature sensor may be disposed proximate to input/output circuitry 74 and control circuitry 150 to monitor temperature levels and participate in closed loop temperature control within display device 10 as determined by stored logic implemented by control circuitry 150. Alternately, temperature sensors arranged for each diode laser may sense temperature levels for each laser and output information that affects fan usage based on stored instructions for desired laser temperature levels. Control circuitry 150 may comprise a commercially available processor, controller or microprocessor such as one of the Intel or Motorola family of chips, for example.

Input/output interfaces 78 are configured to receive at least one cable, wire, or connector, such as a cable for transmitting a video signal comprising video data from a digital computing device. Common ports suitable for use with input/output interfaces 78 may include ports that may receive S video cable, 6-pin mini DIN, VGA 15-pin HDDSUB, an audio cable, component RCA through an S-Video adaptor, composite video RCA cabling, a universal serial bus (USB) cable, fire wire, etc. Input/output interfaces 78 may also include an audio output port for receiving a wired connection from speakers included in a headphone or speaker system.

Input/output circuitry 74 provides an interface between control circuitry 150 and one or more interfaces from input/output interfaces 78. Input/output circuitry 74 and input/output interfaces 78 collectively permit communication between display device 10 and a device that outputs a video signal carrying video data. Video data provided to control circuitry 150 may be in a digital or an analog form (e.g., from a VCR (video cassette recorder). In some cases, input/output circuitry 74 and control circuitry 150 convert analog video signals into digital video signals suitable for digital control of an optical modulator 130 included in display device 10, such as a liquid crystal display "LCD" device or a digital micro mirror "DMD" device.

Input/output circuitry 74 or control circuitry 150 may also include support software and stored logic for particular connector types, such as processing logic required for S-video cabling or a digital video signal. Control circuitry (or controller) 150 includes or accesses stored logic in memory to facilitate conversion of incoming data types and enhances video compatibility of display device 10. Suitable video formats having stored conversion instructions within memory accessed by control circuitry 150 may include NTSC, PAL, SECAM, EDTV, and HDTV (1080i and 720p RGBHV), for example.

Fans 62a and 62b move air through chamber 65 of housing 50 for cooling components of display device 10. In embodiments, fans draw air in through inlet air vents 24a on one side of housing 20 and exhaust heated air out of air vents 24b after the air has cooled internal components of projection-type display device 10 and walls of housing 20. It is to be appreciated that fan and vent placement will vary with internal component placement within chamber 65 of light source. Specifically, fan placement, and airflow patterns affected by fans within chamber 65, is designed according to individual temperature regulation requirements and heat generation contributions of components within housing 50.

Typically, red laser set 12, green laser set 14 and blue laser set 16 and power supply 66 generate the largest proportion of heat within housing 20. Correspondingly, inlet air 69 passes through inlet air vents 24a, initially passes and cools optical modulator 130, control circuitry 150 and input/output circuitry 74 while the air is relatively cool, passes across power supply 66 and red laser set 12, green laser set 14 and blue laser set 16, and exits out exhaust air vents 24b. The exhaust air may also cool fan motors 63a and 63b, which rotate fans 62a and 62b, respectively. In embodiments, multiple fans are used to permit a lower profile for housing 20. As one skilled in the art will appreciate, the number and size of fans used will depend on heat generation within display device 10 and a desired airflow to maintain one or more heat dissipation goals. Chamber 65 may also include one or more airflow guides 67 those are vertical or horizontal within chamber 65 to direct and distribute airflow as desired. In embodiments, circuit boards 430 for red laser set 12, green laser set 14 and blue laser set 16 are vertically arranged perpendicular to the direction of airflow within chamber 65 and airflow guides 67 are arranged to direct cooling air across the surfaces of each circuit board 430.

In embodiments, light output can be from LEDs or lasers. For instance, with lasers, light output from the lasers in red laser set 12, green laser set 14 and blue laser set 16 is provided to fiber optic cabling 72. Fiber optic cabling 72 includes one or more fiber optic cables configured to transmit light from lasers in red laser set 12, green laser set 14 and blue laser set 16 along multiple or common optical paths to relay optics 80, which is disposed along a light path between an exit end of fiber optic cabling 72 and an optical modulator 130. Each fiber optic cable comprises an inlet end 72a configured to receive light from a laser in one of the laser sets and an outlet end 72b configured to outlet the laser light for transmission to relay optics, and subsequent transmission to optical modulator 130. Since fiber optic cabling 72 may be bent and flexibly positioned, fiber optic cabling 72 advantageously permits light transmission between lasers sets and relay optics regardless of the positioning and orientation between the laser sets and relay optics. For example, this allows flexible arrangement of lasers in different laser sets relay optics and prism structure, which may be used to improve space conservation within housing 20, decrease the footprint of housing 20, and minimize display device 10 size.

The number of fiber optic cables may vary with design. Multiple fiber optic cables may be employed in a design where each cable services one or more lasers. Multiple fiber optic cables may be employed in a design where each cable is configured to transmit a primary color. For example, three fiber optic cables may be employed in which each cable transmits light from a primary color set along three different optical paths to three primary color dedicated optical modulators. Alternately, as shown in FIG. 5, a common fiber optic cable may be used to transmit sequentially emitted red, green and blue light along a common light path to a single mirror-based optical modulator 130. Fiber optic cabling 72 may comprise single mode or multimode fibers such as those readily available from a wide variety of vendors known to those skilled in the art. In some cases, a converging lens is disposed at outlet end 72b when fiber optic cabling 72 is a single mode fiber to correct for most any divergence resulting from light transmission within the single mode fiber optic cabling 72.

Fiber optic interface 70 is configured to facilitate transmission of light from each laser into fiber optic cabling 72. Fiber optic interface 70 may include one or more fixtures that position and hold an inlet end for each fiber optic cable included in fiber optic cabling 72 such that light output from each laser transmits into a fiber optic cable. Fiber optic interface 70 may also include optics that direct light from the lasers into fiber optic cabling 72. In embodiments, a single fiber optic cable used in fiber optic cabling 72 and fiber optic interface 70 includes a lens system disposed between the outlet of each laser and the inlet of the single fiber optic cable to direct light from each laser into the single cable. The lens system may comprise at least two lenses: a first lens to direct the light towards the fiber entrance and a second lens that re-collimates light entering the cable.

In other embodiments that implement a one-to-one laser to fiber optic cable 72 relationship, fiber optic interface 70 holds the inlet end 72a for each fiber optic cabling 72 relatively close to the outlet of a single laser to receive light therefrom. Each cable in this case may include a converging lens at its inlet end that facilitates light capture and transmission into the fiber optic cable. In one-to-one embodiments, each fiber optic cable in fiber optic cabling 72 includes a fixture that permits attachment to a laser. For example, conventionally available fiber optic cables available from vendors such as Ocean Optics Inc. of Dunedin, Fla. include a detachable fixture with a thread that allows screwing and fixing of the fiber optic cable to a mating thread disposed on a laser housing. In this case, fiber optic interface 70 comprises the threaded fixture for each fiber optic cable and a mating thread is added to the laser housing.

In common light path transmission embodiments, light from lasers in each laser set travels along a common path before receipt by optical modulator 130. In this case, red, green and blue light is provided to fiber optic cabling 72 in a time synchronous manner that corresponds to red, green and blue video data provided in a video signal to optical modulator 130.

Relay optics 80 converts light received from fiber optic cabling 72 to light flux suitable for transmission onto optical modulator 130 via prism structure. This may include shaping and resizing light flux received from fiber optic cabling 72 using one or more lenses, and may include homogenizing intensity across the light flux distribution. To do so, relay optics may comprise one or more lenses suitably spaced and arranged within housing 20. In embodiments, first lens 80a is selected and arranged to increase the area of light flux received from fiber optic cabling 72, while second lens 80b is selected and arranged to convert the divergent light transmitted by first lens 8a into substantially collimated flux for transmission onto optical modulator 130.

A rotating diffuser 82 is disposed between first lens 8a and second lens 80b. Rotating diffuser 82 comprises a transparent glass screen 84 that is rotated by a motor 86. As shown in FIG. 5, rotating diffuser 82 intercepts an unfocused beam, thereby reducing both temporal and spatial coherence, and reducing potential speckle in the output image. In other embodiments, rotating diffuser 82 is introduced into the light path between the exit the fiber optic cabling 72 and before receipt by lens 8a.

One skilled in the art will appreciate that rotating diffuser 82 may be arranged in other locations along the light path between generation of laser light in laser sets and output of the projected image from external projection lens 140h. For example, rotating diffuser 82 may be arranged proximate to a junction where light from multiple fiber optic cables is transmitted into a common fiber optic cable. In this case, rotating diffuser 82 may be arranged at the focus of a beam to only reduce temporal coherence, while maintaining the spatial coherence (e.g., the ability for the beam to be focused to a point).

Rotating diffuser 82 may also be arranged to intercept light between a laser and a fiber optic coupling, or between a final relay lens and prism structure, for example. In embodiments, the coherence diffuser is arranged to intercept laser light before it is expanded in flux area by any relay optics. Intercepting a small flux area light beam reduces the size of the transparent glass screen 84 and coherence diffuser motor 86.

In embodiments, relay optics comprise a pair of fly-eye lenses arranged in the optical path between laser sets and prism structure, such as between second lens 80b and prism structure. Cumulatively, the pair of fly-eye lenses re-distributes light uniformly across the flux transmitted onto optical modulator 130. The first fly-eye lens includes a plurality of lenses that spatially divide input light flux (e.g., from second lens 80b) into a set of blocks or components that each comprise a portion of the total inlet flux area, and transmits light for each block to a corresponding block in the second fly-eye lens. The second fly-eye lens includes a plurality of lenses, the number of which is the same as the number of lenses in the first fly-eye lens, and outputs light for each component to an object region to be illuminated in such a manner that the partial luminance fluxes from each lens are superimposed on each other at the object region.

In other embodiments, relay optics comprise an integrator tunnel disposed in the optical path between lasers sets and prism structure, such as between lens 80b and prism structure. The integrator tunnel uses total internal reflection to output luminous flux with an about uniformly distributed intensity across a shape determined by an output geometry at output end, which is typically rectangular. The outlet may also be dimensioned to match the aspect ratio of the downstream optical modulator 130. The integrator may comprise a solid glass rod such as those known and used in the art. If required, one or more lenses may be arranged to re-size flux output by the integrator tunnel from a size that exists at an output end to a size that is suitable for reception by optical modulator 130.

Prism structure provides light to optical modulator 130 at predetermined angles, and transmits light from optical modulator 130 to the projection lens set along output path 31. Prism structure comprises prism components 14a and 140b that are separated by air space or bonding interface 140c. Bonding interface 140c is disposed at such an angle so as to reflect light provided from relay optics towards optical modulator 130. In addition, bonding interface 140c allows light reflected by optical modulator 130 to transmit to projection lens set along output path 31.

Optical modulator 130 selectively transmits (or reflects) light to provide an output image along output path 31. To do so, optical modulator 130 is supplied with video data included in a video signal and selectively transmits light according to the video data. The video data is typically provided to optical modulator 130 on a frame-by-frame basis according to individual pixel values. If the video data is not received by projection-type display device 10 in this format, control circuitry 150 in housing 20 converts the video data to a suitable format for operation of optical modulator 130. In embodiments, individual light modulation elements within optical modulator 130, which each correspond to an individual pixel on the output image, translate received digitized pixel values into corresponding light output for each pixel.

In embodiments, optical modulator 130 is a mirror based spatial light modulator, such as a digital micro-mirror device (or DMD, a trademark of Texas instruments Inc.) commercially available from Texas Instruments, Inc. Most any XGA or SVGA resolution chip in the SDR or DDR series is suitable for use with embodiments. In this case, optical modulator 130 comprises a rectangular array of tiny aluminum micromechanical mirrors, each of which individually deflects about a hinged axis to selectively reflect output image light down output path 31, and reflect non-image light away from output path 31. The deflection state or angle of each mirror is individually controlled by changing memory contents of an underlying addressing circuit and mirror reset signal. The array of mirrors is arranged such that each mirror is responsible for light output of a single pixel in the video image. Control signals corresponding to pixel output are supplied to control electrodes disposed in the vicinity of each mirror, thereby selectively deflecting individual mirrors by electromagnetic force according to video data on a pixel by pixel basis. Light reflected by each mirror is then transmitted along output path 31, through prism structure 14a-140e, and out of projection-type display device 10 using projection lens set.

The arrangement of relay optics 80 and the faces of prism structure control the illumination angles for optical modulator 130. After light reflection by individual mirrors of optical modulator 130, reflected light exits prism structure towards projection lens set along output path 31. Output path 31 characterizes a) the direction of image light selectively transmitted by optical modulator 130 within display device 10, and b) the direction of light output from display device 10. For light selectively transmitted by optical modulator 130, output path 31 extends as a straight line from optical modulator 130 for elements in their 'on' state, through prism structure 14a-140e, and out external projection lens 140h.

A projection lens set is disposed along output path 31 configured to project light transmitted by the optical modulator along output path 31 from display device 10. Projection lens set manipulates image light transmitted by optical modulator 130 along output path 31 such that a projected image cast on a receiving surface enlarges as distance from projection lens 140h to the receiving surface increases. Projection lens set comprises first projection lens 140f, second projection lens 140g and external projection lens 140h, each of which is disposed centrically along and orthogonal to output path 31. Distances between each projection lens may vary with a desired splay angle from external projection lens 140h, as may the number of projection lens set used. In embodiments, display device 10 is designed for a short throw distance, such as between about six inches and about 15 feet. Display device 10 may also include one or more buttons or tools that allow a user to manually focus and manually zoom output from projection lens set.

In operation, light generated by lasers in laser sets is collected by and transmitted within fiber optic cabling 72. Relay optics 80 convert light transmitted by fiber optic cabling 72 to a luminous flux size suitable for transmission onto optical modulator 130 via reflection within prism structure 14a-140e. Light propagating through prism component 14a reflects off a surface 140d at bonding interface 140c by total internal reflection and forms a reflected pre-modulated beam directed towards optical modulator 130. The reflected pre-modulated beam travels through prism component 14a to reach optical modulator 130, which selectively transmits light according to video data in a signal that corresponds to an image to be projected. Light output through exit face 140e is characterized by output path 31, which propagates through projection lens set that manipulates image light for enlarged display onto a screen or suitable receiving surface. Typically, the image is cast with a splay angle such that the image enlarges as the distance to a receiving surface increase.

In embodiments, the luminance sensor 152 may be photodiode arrays, charge-coupled device (CCD) camera or complementary metal oxide semiconductor (CMOS) camera. However, any other light sensor or camera with the desired light sensitivity may be used as a luminance sensor for the purposes of the light intensity detection. The luminance sensor 152 may be incorporated with, connected to, or otherwise associated with the projector a) to detect light directly emitted from one or more lasers, b) within the projector to detect light at some point between laser generation and before output from the projections optics, and/or c) to detect light at a cast image. In embodiments, the luminance sensor 152 may be mounted on the receiving surface. Alternatively, the luminance sensor 152 may be attached to the projection-type display device 10, such as by either mounting the luminance sensor 152 on the exterior of the projection-type display device, or by incorporating the luminance sensor 152 within the projection-type display device itself. In either scenario, the luminance sensor 152 may be located so as to minimize differences in the field of view of the sensor and the area of the projected image.

In embodiments, the control circuitry 150 updates the desired amount of light based on the real time readings, and selectively turns off a subset of lasers when the real time readings is lower than a predetermined threshold. Alternatively, the control circuitry updates the desired amount of light based on the real time readings, and selectively turns on the subset of the lasers when the real time reading exceeds a predetermined threshold. The real time reading may relate to video data being projected, condition of one or more lasers (e.g., temperature or duration of light projection), or combinations thereof. For example, when a screen goes black in a movie, the luminance sensor 152 may detect that the luminance of projected image become lower. The control circuitry 150 updates the desired amount of light, so that the light source 110 may adjust the output power of the light source 110.

In other embodiments, the total number of lasers in the set of lasers (or LEDs) is greater than a number of lasers needed to produce a desired amount of light at maximum luminance for an image. This is referred to as 'redundant' laser supply. For example, a set of six lasers may only need five lasers to generate and emit the desired amount of light. The sixth laser allows failure of one laser in the set to not compromise operability of the entire set—and the display device.

In addition to having an extra laser, the extra laser(s) in a laser set also allow the lasers to be cycled for heat dissipation purposes and to extend longevity of each and all lasers in the set. More specifically, lasers in a red, green or blue laser set cycle or other wise toggle on and off to reduce local heat generation for each laser. This periodic redundant laser cycling keeps sum temperatures lower for each laser and reduces local heat generation at each laser—thereby extending longevity of each laser, its corresponding laser set, and the device.

The amount of cycling and shut down duration for each laser (for temperature and heat generation relief) will depend on the number of extra redundant lasers included in a set, as one of skill in the art will appreciate. As the number of lasers increases, the shut down duration for each laser—in terms of frequency and time spent off—will increase.

The amount of cycling and shut down duration may also depend on the intensity of light needed. For example, the number of active lasers being used can be reduced when the video to be displayed needs less intensity (e.g., dark scenes).

Heat removal speeds and dynamics may also affect cycling durations and times. If heat removal benefits from slightly elevated temperatures, then cycling may be reduced to elevate temperatures and drive faster heat dissipation.

A temperature sensor 154 that detects the temperature of the set of laser is provided. The control circuitry 150 is configured to determine the temperature of each laser in the set of lasers. For example, the control circuitry turns off the laser diode with the highest temperature among the set of lasers. In other embodiments, a timer for measuring the time the set of lasers exceeds a predetermined amount is included in projection-type display device. The control circuitry 150 operates to turn off a laser diode which has been ignited a predetermined period of time.

It will be understood that temperature based redundant control increases longevity for individual lasers that benefit from periodic shutdown and those whose endurance suffers from elevated heat exposure, thereby also increasing longevity for a display device on a given redundant laser set.

In yet other embodiments, the projection-type display device 10 includes an ambient light sensor 156. The ambient light sensor 156 detects the luminance of ambient light of the projection environment. Accordingly, the control circuitry 150 may increase the desired amount of light if the luminance of ambient light exceeds a predetermined level, and decreases the desire amount of light if the luminance of ambient light is less than the predetermined level.

Figure 6:
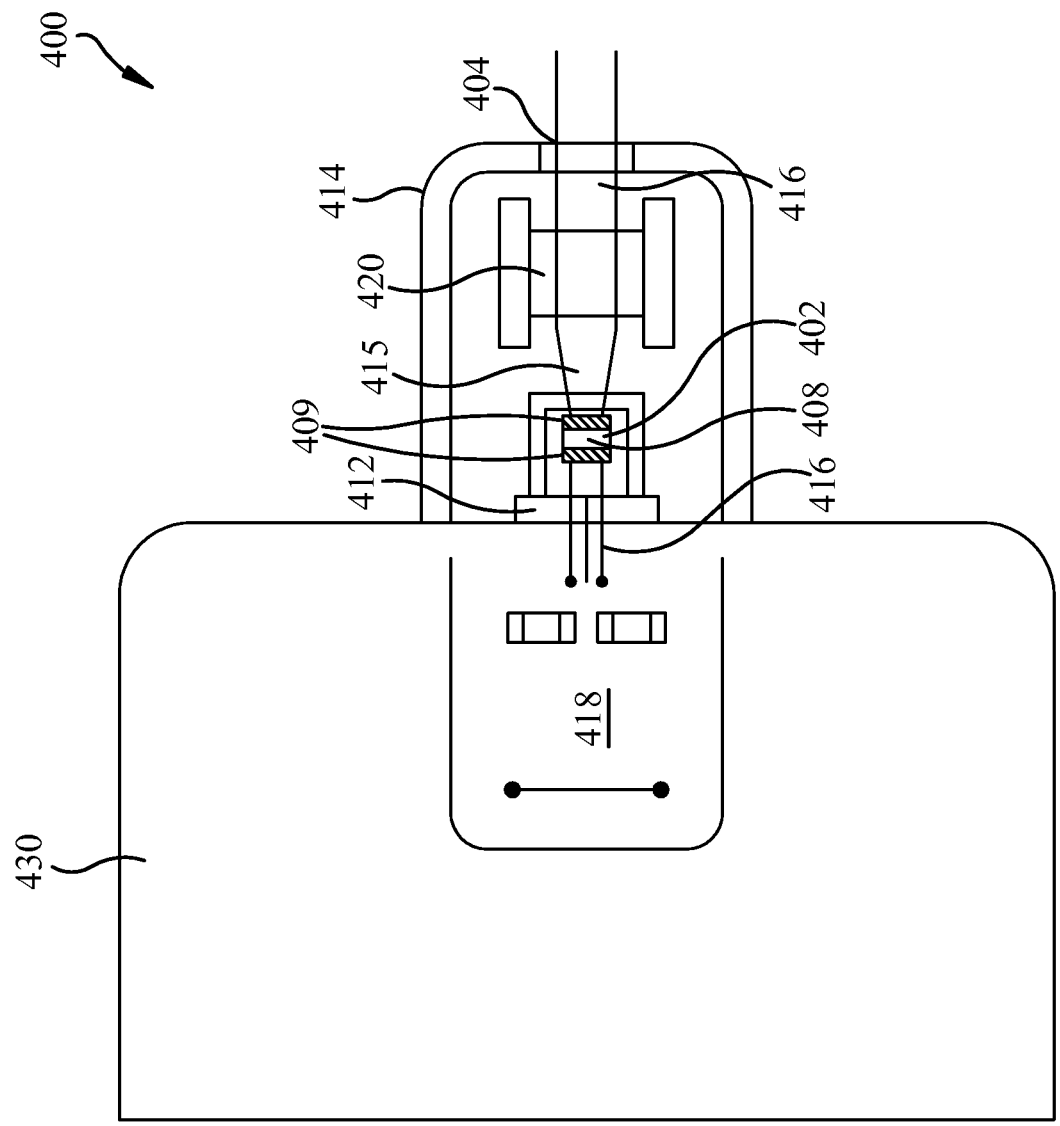
FIG. 6 illustrates an example circuitry for use in a laser set in accordance with aspects of the innovation.

FIG. 6 illustrates an example circuit for use in red laser set 12 (or as adapted for LEDs in alternate embodiments). In embodiments, each diode laser in red laser set 12 generates and emits red light including a wavelength between about 615 and about 690 nanometers. Each diode laser in red laser set 12 may include a lasing medium and laser cavity configured to generate and emit light including a wavelength between about 625 and about 645 nanometers. As the term is used herein, a diode laser refers to a device, system or module that outputs laser light and employs a semiconductor to generate the laser light. Diode laser 400 is also commonly referred to as a semiconductor laser, a laser diode or injection laser. Diode laser 400 comprises lasing medium 402, output lens 404, lasing chamber 408, monitor photodiode chip 412, housing 414, leads 416, control circuitry 418, and correction lens 420, all mounted on circuit board 430.

In embodiments, each laser in green laser set 14 emits light including a wavelength between about 510 and about 570 nanometers. Green laser set 14 may comprise green laser light emitting diode pumped solid state lasers that each emit green light including a wavelength between about 530 nanometers and about 550 nanometers. In embodiments, green laser set 14 and/or blue laser set 16 comprises one or more diode pumped solid-state (DPSS) lasers. Solid-state lasers generally employ a crystal doped with an impurity within their active lasing medium. A DPSS laser refers to a device, system or module that outputs laser light.

Figure 7:
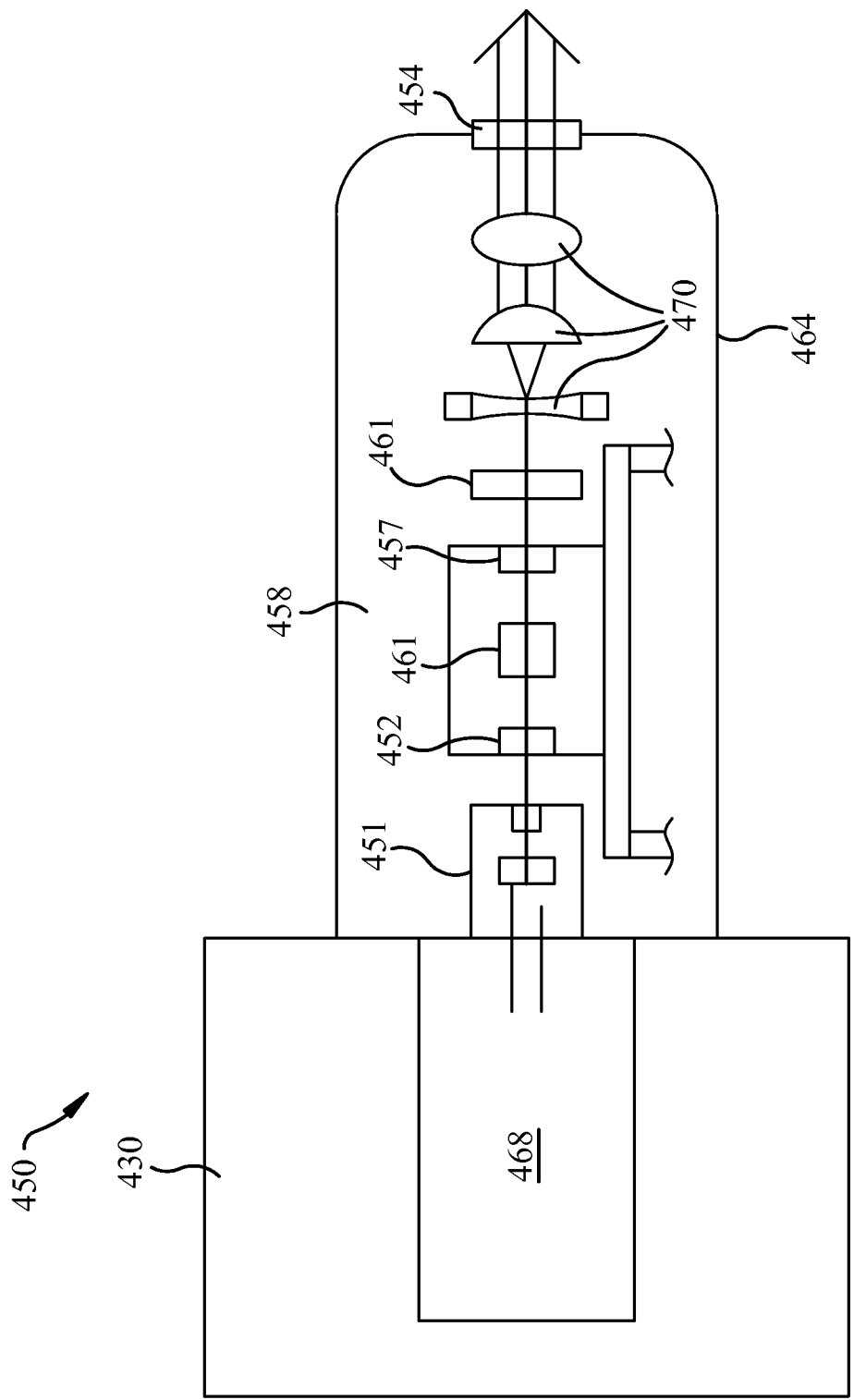
FIG. 7 illustrates an example DPSS laser in accordance with aspects of the innovation.

FIG. 7 illustrates an example schematic of DPSS laser 450 in accordance with embodiments. DPSS laser 450 comprises a pumping light source 451, lasing medium 452, output optics 454, lasing chamber 458, housing 464, control circuitry 468, and optics 470, crystal 461, coupler mirror 457, and circuit board 430.

Blue laser set 16 is designed or configured to produce blue light for use in display device 10. In embodiments, each laser in blue laser set 16 emits blue light including a wavelength between about 420 and about 500 nanometers. Blue laser set 16 may include blue diode lasers and each blue diode laser comprises a lasing medium and laser cavity for generating and emitting light including a wavelength between about 430 and about 460 nanometers. Blue diode lasers suitable for use in blue laser set 16 are described in further detail with respect to FIG. 6. Blue laser set 16 may include blue laser light emitting diode pumped solid-state lasers, which are depicted in FIG. 7.

In general, the combined power of lasers for each color set may be adapted according to a desired light intensity output for display device 10 and according to the light sensitivity of a viewer to each red, green and blue color, as is to be appreciated. The power of an individual laser in a set may vary with design; while the number of lasers in each laser set will vary with the output power of individual lasers used in the set.

In embodiments, each laser in red laser set 12, green laser set 14 and blue laser set 16 includes a sensor that provides feedback regarding laser performance. For example, diode lasers in red laser set 12 may include a photodiode chip that provides optical feedback from each diode laser. Information from each photosensor is then provided to control circuitry 150 to provide an indication of laser output for each laser set.

Figure 8:
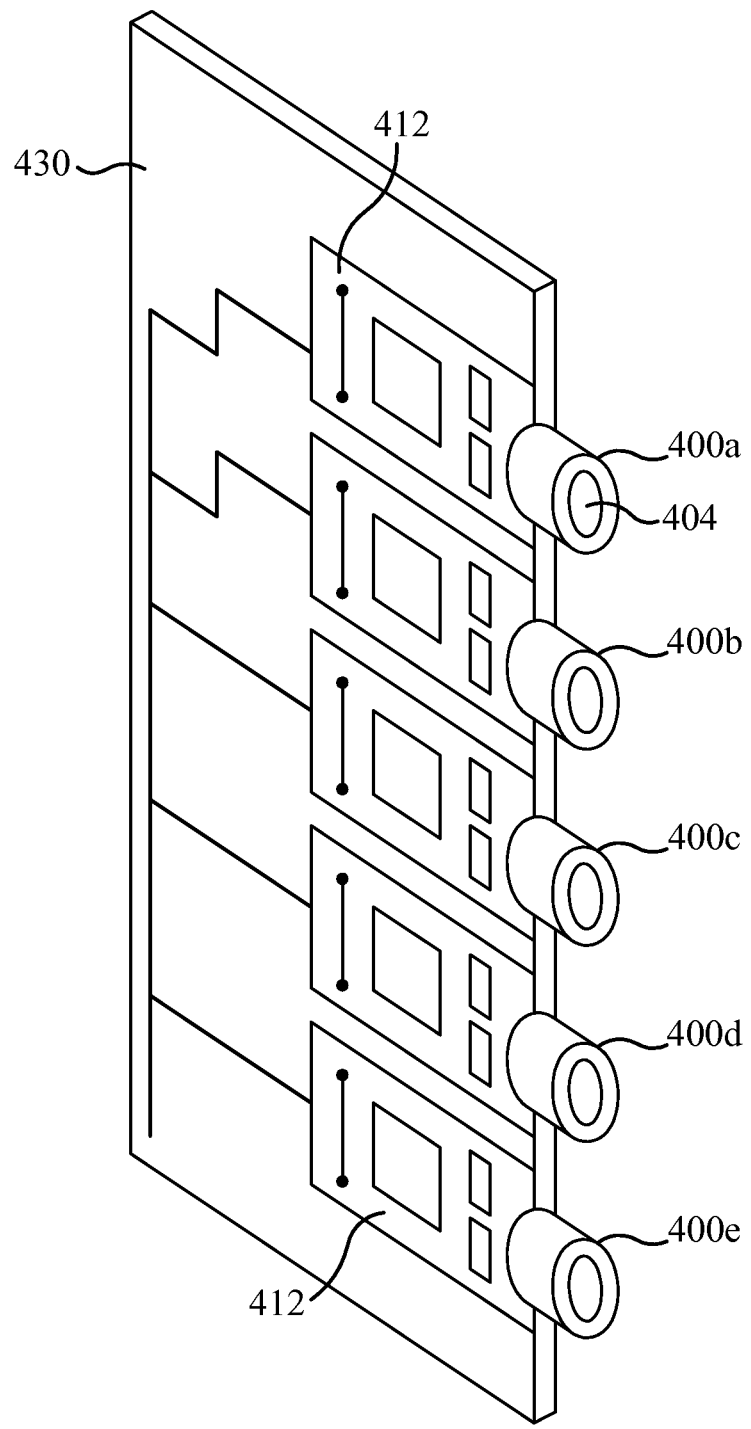
FIG. 8 illustrates an example multi-laser circuit board in accordance with aspects of the innovation.

FIG. 8 illustrates one or more lasers are installed on a circuit board 430, which mounts, and provides electrical communication for, each laser installed thereon. Five diode lasers 40a-e are installed thereon in accordance with embodiments, though as noted above, any of the embodiments described herein as applied to lasers or diode lasers can be adapted for use with LEDs, since both act as a light source though with differing operating parameters for the given laser or LED. This configuration of diode lasers 40a-e reduces space for laser sets within display device 10. Control circuitry 412 on circuit board 430 regulates current provided to each diode laser 40a-e. Although circuit board 430 shows five diode lasers 400, it is understood that circuit board 430 may include a combination of diode lasers 400 and DPSS lasers 450 as well as a different number of total light sources. In embodiments, diode lasers 40a-e all output light having a similar wavelength, such as red. In other embodiments, lasers on a single board 430 output different colors.

In other embodiments, the total number of lasers in the set of lasers, or LEDs as the case may be, is greater than a number of lasers needed to produce the desired amount of light. Redundant laser (or LED) supply is advantageous to prevent failure of an individual laser from compromising output for the entire set, or output for a given primary color. Correspondingly, each laser set may continue to output its desired and intended luminous power and primary color even though an individual laser in the set is no longer operable. In most cases, this increases display device 10 longevity for a given set of lasers, with only a slight increase in cost and size.

Periodic shutdown for each laser in a redundant set may also be beneficial for heat dissipation. This allows individual lasers to be heated less over the course of extended usage of display device 10, such as usage associated with motion picture video viewing. Shutdown for individual lasers in a set may be cyclical based on a predetermined shutdown scheme. For example, in a four laser redundant scheme where three lasers are needed for desired output power in normal usage, each of the four lasers may take turns shutting down for a predetermined time. This gives each laser periodic time to cool, and results in less heat generation for each laser.

Alternately, shutdown may be used to protect an individual laser that is heating to a threshold temperature as sensed by a temperature sensor disposed in proximity to the laser. Logic stored in memory and accessible to control circuitry 76 (FIG. 5) then shuts down the laser (and may turn on fans) to prevent the heating laser from reaching the threshold temperature. Multiple threshold temperatures may be established in this manner; and logic may be implemented that determines which lasers in a redundant set are used when multiple lasers in the set reach a particular threshold temperature. It is to be understood that redundant laser supply also advantageously increases longevity for individual lasers that benefit from periodic shut-down, thereby also increasing longevity for display device 10 on a given laser set.

In embodiments, each laser in sets 16 includes a temperature sensor that detects the temperature of each laser in the set. As described supra, control circuitry 76 uses feedback from the temperature sensors to determine a) if any lasers are heating to one or more temperature thresholds, and b) the specific temperature of each diode laser to minimize temperature based wavelength drift. Based on this information and stored instructions for each condition, or multiple conditions, control circuitry 76 determines which of the lasers in the set produce light based on the temperature of each laser in the set. The stored logic may also include instructions for special events, such as when multiple lasers reach a predetermined temperature threshold, or when an individual laser reaches a higher or dangerous temperature threshold.

Some diode lasers 400 include a temperature based frequency drift that alters the wavelength of output laser light with temperature of the laser. Drift of 0.3 nanometers/degree Celsius are common. Typically, a laser manufacturer knows temperature based frequency drift for a given laser. In this case, redundant laser supply may decrease any temperature-based drift by decreasing the average temperature variation for each laser in a redundant set, thereby increasing light consistency and image quality.

Figure 9:
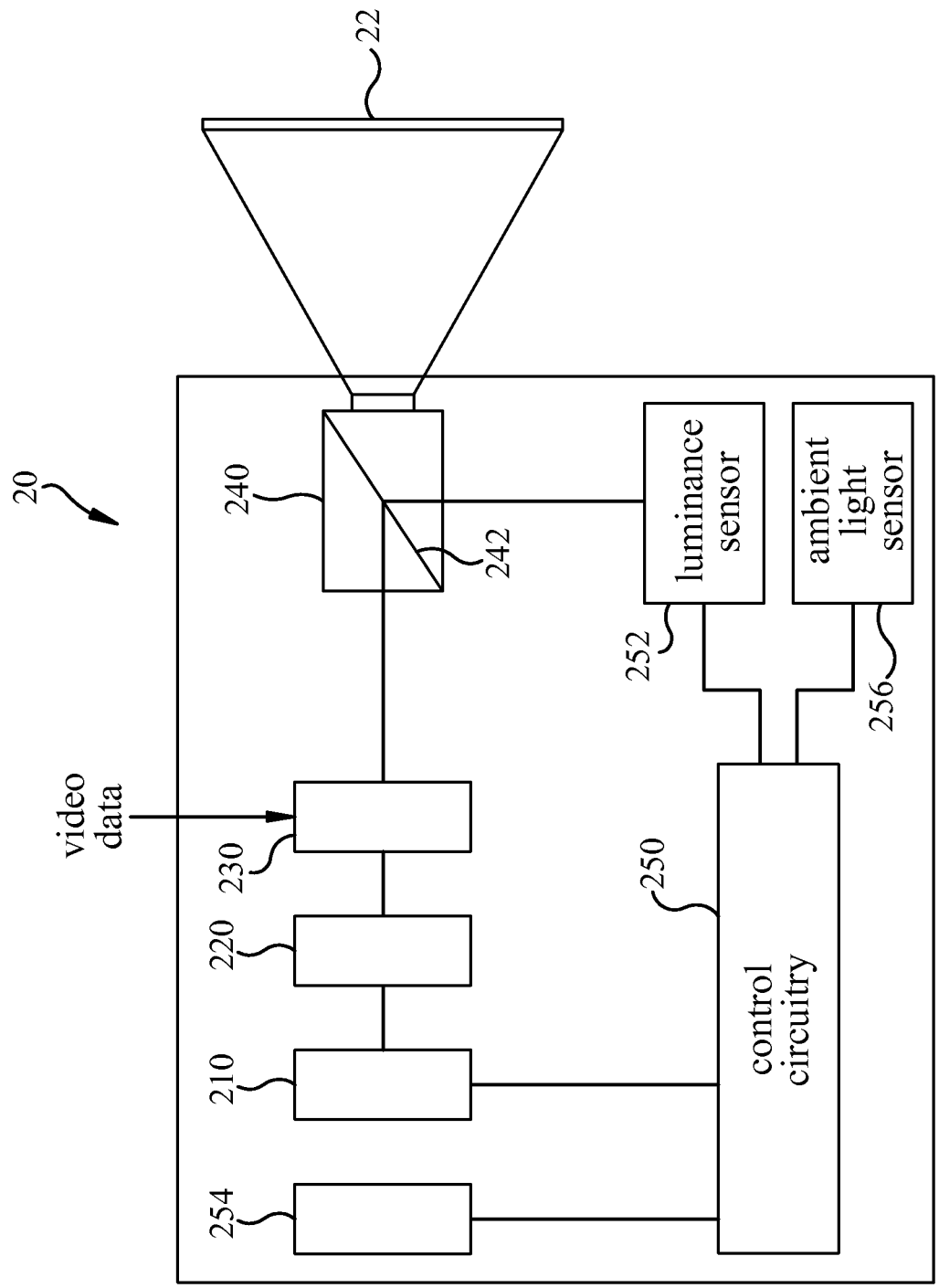
FIG. 9 illustrates an example block diagram of a projection-type display device projecting images in accordance with aspects of the innovation.

FIG. 9 shows a block diagram of a projection-type display device 20 projecting images on a receiving surface 22 in accordance with embodiments. Display device 20 comprises light source 210, optical system 220, optical modulator 230, projection lenses 240, control circuitry 250 and luminance sensor 252, temperature 254 sensor, and ambient light sensor 256. The luminance sensor 252 is a light-sensitive device capable of capturing the image to be projected. The luminance sensor 252 may be photodiode arrays, charge-coupled device (CCD) camera or complementary metal oxide semiconductor (CMOS) camera. However, any other light sensor or camera with the desired light sensitivity may be useful as a luminance sensor for the purposes of the light intensity detection. The luminance sensor 252 may be incorporated with, connected to, or otherwise associated with the projector.

In embodiments, the luminance sensor 252 may be mounted on the receiving surface 22. Alternatively, the luminance sensor 252 may be attached to the projection-type display device 20, such as by either mounting the luminance sensor 252 on the exterior of the projection-type display device, or by incorporating the luminance sensor 252 within the projection-type display device itself. In either case, the luminance sensor 252 may be located so as to minimize differences in the field of view of the sensor and the area of the projected image.

In embodiments, the luminance sensor 252 shares at least a portion of an optical path for both image projection and luminance sensing. This may be accomplished, for example, by placing a beam splitter 242 in the optical path of the projection lenses 240.

Figure 10:
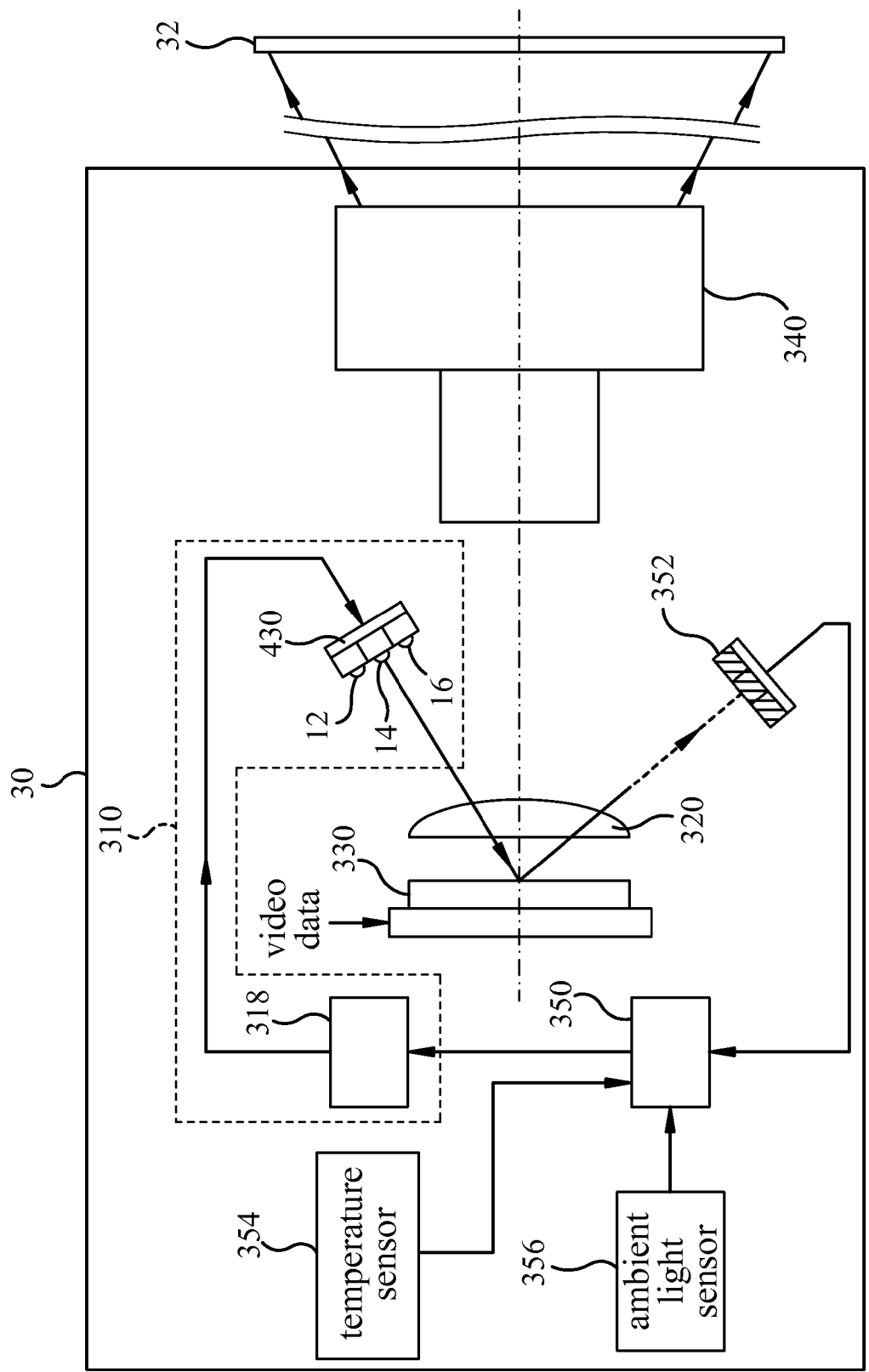
FIG. 10 illustrates an alternative example block diagram of a projection-type display device projecting images in accordance with aspects of the innovation.

FIG. 10 illustrates an alternative example block diagram of a projection-type display device 30 projecting images on a receiving surface 32 in accordance with embodiments. Display device 30 is configured to produce and project a video image for display on a receiving surface. Display device 30 comprises light source 310, optical system 320, optical modulator 330, projection lenses 340, control circuitry 350, luminance sensor 352, temperature sensor 354, and ambient light sensor 356. Light source 310 includes light source controller 318, circuit board 430, and laser sets. Optical modulator 330 may include a plurality of movable mirror elements (not shown). The movable mirror elements move selectively between a first reflecting position and a second reflecting position in accordance with the image signal to reflect the incident light toward the projector lens 340 or in the direction other than that of the projector lens 340. The light advancing toward the projector lens 340 forms a projection image on the receiving surface 32.

The structure, in which the light intensity, or the outputs of the laser sets is measured, allows the projection-type display device 30 to respond to the physical change of the laser set to control the light intensity. In some cases, the waste light, which is not used for image formation, is used to measure the light intensity. Alternatively, the sensor detects the amount of light reflected by optical modulator 330. As described above, the light intensity of the light source 310 may be controlled by the control circuitry 350 in response to the sensor output.

Figure 11:
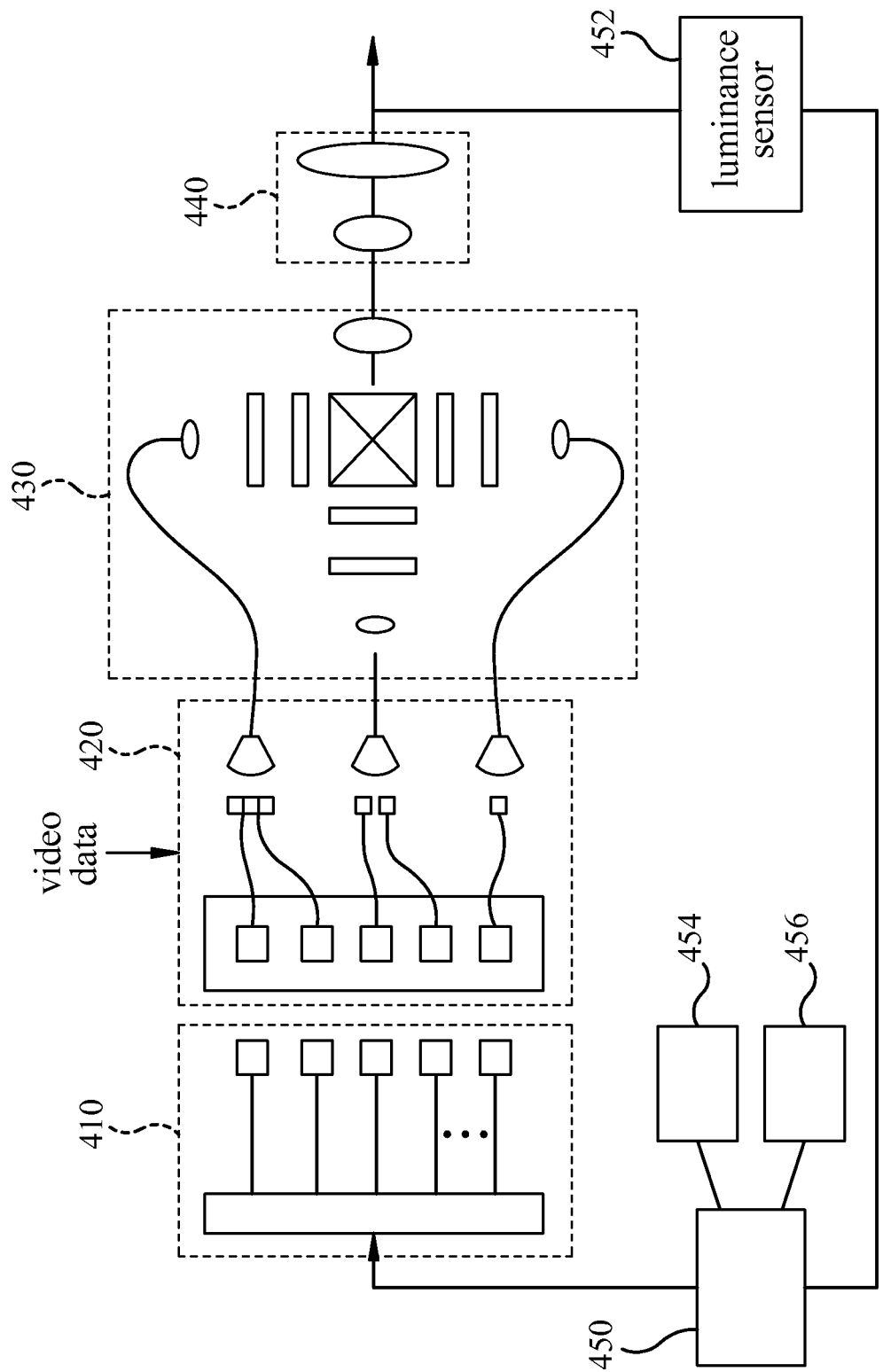
FIG. 11 illustrates an alternative example block diagram of a projection-type display device projecting images in accordance with aspects of the innovation.

FIG. 11 illustrates another example block diagram of a projection-type display device 40 in accordance with embodiments. Display device 40 comprises light source 410, optical system 420, optical modulator 430, projection lenses 440, control circuitry 450, luminance sensor 452, temperature sensor 454 and ambient light sensor 456. The light source 410 produces a desired amount of light. The optical modulation 420 is configured to increase flux area of the light. The optical modulator 430 is and light valve with 3 LCDs. The luminance sensor 452 detects a real time reading to measure an image projected by the projection-type display device. The control circuitry 450 dynamically controls the light source 410 based on the real time readings to dynamically vary the luminance of the set of laser.

The ambient light sensor 456 detects the luminance of ambient light of the projection environment. In accordance therewith, the control circuitry 450 may increase the desired amount of light if the luminance of ambient light exceeds a predetermined lever, and/or decrease the desire amount of light if the luminance of ambient light is less than the predetermined level.

In other embodiments, the total number of lasers in the set of lasers is greater than a number of lasers needed to produce the desired amount of light. A temperature sensor 454 that detects the temperature of the set of laser may be provided as shown. The control circuitry 450 is configured to determine the subset of lasers based on a temperature of each laser in the set of lasers. For example, the control circuitry turns off the diode laser with the highest temperature among the set of lasers. In other embodiments, a timer for measuring the time the set of lasers exceeds said predetermined amount is included in projection-type display device. The control circuitry 450 operates to turn off from a laser diode which has been ignited a predetermined period of time.

Laser based systems described herein advantageously provide a light generation option for projection-type display devices that requires low voltage and consumes low power. Diode lasers are often considered more efficient in terms of light generation per input energy, particularly relative to white light lamps. Laser light sources also generate less heat than a white light lamp, thereby easing heat dissipation requirements. This allows for smaller cooling fans that consume less power and require less space. Another advantage of diode lasers is that diode lasers emit relatively monochromatic colored light, thereby reduce (or eliminate) a need for a color wheel and its spatial requirements. It will be understood that eliminating the color wheel motor is advantageous since it also occupies space, consumes power and generates heat. Cumulatively, these factors each contribute to significantly reduced power consumption for a display device and enable battery-powered projection-type display devices.

Laser based designs described herein are also lighter and require less space than white light lamp sources, which enables projection-type display devices that are smaller, less weight, and increasingly portable. In addition, the collimated light output from lasers is significantly smaller in cross-sectional flux area and therefore requires less space for optical manipulation, such as smaller lenses, further saving space and reducing display device size. In embodiments, display device 10 is less than 4 pounds. As mentioned above, walls of housing 20 may comprise a lightweight and stiff or rigid molded plastic, composite, alloy or metal that reduces overall weight of display device 10. In other embodiments, display device 10 is less than 2 pounds.

Display devices described herein also benefit from highly collimated and substantially coherent light output. This permits increased depth of focus for a projected image; and permits an increased range of focus. For some display device designs, this may eliminate a need for manual focusing tools and thereby further reduce the size and cost of display device.

With respect to usage, a display device may receive analog or digital video signals and data from a range of systems and devices. In addition to personal computers such as desktop computers and laptop computers, a variety of other computer systems and digital devices may output video data to the display device. Handheld computers, portable digital assistants (PDAs) and portable digital devices are increasingly integrating video functionality, including the ability to communicate with an external display device. Other portable digital devices such as video games, portable video games, portable digital video recorders and digital cameras may also provide video output to display device described herein.

One current trend is hybrid entertainment devices that integrate the functionality of computer systems, stereos, and televisions. In addition, set-top boxes associated with cable and satellite television services are becoming much more sophisticated user interfaces as interactive services become available to cable customers. Any of these devices may employ and benefit from video output using a display device as disclosed and claimed herein. The scope of digital computer systems is expanding hurriedly and creating many systems and devices that may employ some of the embodiments. A merging of television, video, and computer functions into a single device also adds value to the embodiments since the sensitivity to image quality and size is high in applications such as motion picture viewing. Moreover, it is to be appreciated that the other embodiments may be practiced with other computer system configurations, multiprocessor systems, microprocessor-based or programmable consumer electronics, minicomputers, mainframe computers, and the like.

Display devices may provide projected images having an image size ranging from inches to many feet, as determined by a user and environment. Image size for a projector typically depends on mechanical factors such as the distance from the projector to the receiving surface and a splay angle for the projection lens system 140 (FIG. 5). Display device 10 is well-suited for display of motion pictures and still photographs onto screens. In addition, display device 10 is also useful for conducting sales demonstrations, playing video games, general computer usage, business meetings, and classroom instruction, for example.

Although the foregoing paragraphs described some detail for purposes of clarity of understanding, those skilled in the art will recognize that various modifications may be made within the scope of the appended claims. For example, although diode lasers described herein have primarily been described with respect to side emitting Fabry-Perot diode laser designs, it is understood that other designs such as vertical cavity surface emitting diode lasers, other vertical emitting and distributed feedback laser designs may be used. Moreover, as was emphasized above, any of the embodiments described in the context of lasers, or diode lasers, are equally applicable to alternate embodiments that instead use LEDs as the light source. In addition, optics may also be employed to alter other unwanted laser beam characteristics not specifically described above. For example, one or more wedge shaped prisms may be used to alter or correct for any elliptical beam shape in a laser beam, if present. By manipulating the relative orientations of the prisms, the prisms may be used to shape or extend the beam profile in one more directions.

Further, although some embodiments has been described with respect to fiber-optic cabling for transmission of light between sets of lasers and relay optics that deliver the light to the optical modulator, it is understood that fiber-optic cabling is not always necessary. In embodiments, sets of lasers are arranged to emit light towards optics system, which converts incoming light to a light flux suitable for transmission onto optical modulator and transmits the light to an optical modulator without the use of fiber-optic cabling. For example, the lasers may be arranged to emit light towards a first lens that spans the laser light from each laser onto a first fly-eye lens.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
 a detection component configured to monitor at least one parameter related to a light source, wherein the light source is part of a projection device;
 a luminance sensor configured to detect luminance of an image projected by the projection device onto a receiving surface external to the projection device, wherein the luminance sensor is positioned as a function of a difference determined between a field of view of the luminance sensor and an area of the receiving surface on which the image is projected; and
 a controller component configured to adjust the light source based at least in part on a comparison of the at least one parameter to a threshold, wherein the threshold is selected to increase longevity of the light source, and to modify the threshold based on at least one environmental factor of the projection device,
 wherein the at least one parameter includes the luminance of the projected image on the receiving surface.

2. The system of claim 1, wherein the light source comprises a plurality of diode lasers.

3. The system of claim 1, wherein the function minimizes the difference.

4. The system of claim 1, wherein the at least one parameter further includes a diode laser temperature, and the threshold includes a temperature above which longevity failure of a diode laser portion of the light source due to prolonged use above the temperature will occur.

5. The system of claim 1, further comprising a plurality of sensors that facilitate capture of diode laser information, wherein the diode laser information defines the at least one parameter.

6. The system of claim 1, further comprising an adjustment component configured to toggle a portion of the light source on or off as a function of the at least one parameter.

7. The system of claim 1, wherein the at least one environmental factor includes at least one of ambient light or temperature.

8. The system of claim 1, wherein the luminance sensor is located on an exterior surface of the projection device.

9. A non-transitory computer-readable storage medium comprising computer-executable instructions that, in response to execution, cause a device to perform operations, comprising:
 producing an amount of light from a light source of a projection display device comprising a set of lasers;
 detecting, via a luminance sensor, a luminance of an image projected by the projection device onto a receiving surface external to the projection device, wherein the luminance sensor is located as a function of a difference determined between a field of view of the luminance sensor and an area of the receiving surface on which the image is projected;
 monitoring at least one parameter related to the light source, wherein the at least one parameter includes the luminance of the projected image on the receiving surface;
 controlling a subset of the set of lasers based at least in part on a comparison of the at least one parameter to a threshold, wherein the threshold is selected to increase a longevity of the light source, and shifting the threshold based on at least one environmental factor of the projection display device.

10. The non-transitory computer-readable storage medium of claim 9, wherein the at least one parameter includes a laser temperature, and the threshold is a temperature above which a longevity failure of a laser of the set of lasers due to prolonged use above the temperature will occur.

11. The non-transitory computer-readable storage medium of claim 9, the operations further comprising:
adjusting the amount of light based on the at least one parameter;
turning off the subset of the set of lasers responsive to the at least one parameter being lower than the threshold; and
turning on the subset of the set of lasers responsive to the at least one parameter being greater than the threshold.

12. The non-transitory computer-readable storage medium of claim 11, the operations further comprising:
detecting a luminance of ambient light of an environment of the projection display device;
increasing the amount of light responsive to the luminance of the ambient light being greater than a predetermined luminance; and
decreasing the adjusted amount of light responsive to the luminance of ambient light being less than the predetermined luminance.

13. The non-transitory computer-readable storage medium of claim 9, wherein the at least one environmental factor includes at least one of ambient light or temperature.

14. The non-transitory computer-readable storage medium of claim 9, the operations further comprising:
measuring an amount of time that a laser has been turned on; and
turning off the laser in response to the amount of time exceeding a defined amount of time.

15. A device comprising:
a set of lasers or light emitting diodes (LEDs) that produce an amount of light;
an optical modulator configured to selectively transmit light produced by at least one of the set of lasers or LEDs according to video data included in a video signal provided to the device;
an optics system configured to receive light produced by the at least one of the set of lasers or LEDs before receipt by the optical modulator and to increase a flux area of the light;
a projection lens system configured to project the light transmitted by the optical modulator along a projection path;
a luminance sensor configured to detect luminance of an image projected by the device onto a receiving surface external to the device, wherein the luminance sensor is positioned as a function of a difference between a field of view of the luminance sensor and an area of the receiving surface on which the image is projected;
a detection component configured to monitor at least one parameter related to the set of lasers or LEDs, wherein the at least one parameter includes the luminance of the projected image on the receiving surface; and
a controller configured to adjust the set of lasers or LEDs based at least in part on a comparison of the at least one parameter to a threshold, wherein the threshold is selected to increase a longevity of the set of lasers or LEDs, and to alter the threshold based on at least one environmental criterion associated with the device.

16. The device of claim 15, further comprising an ambient light sensor, wherein the ambient light sensor is configured to detect a luminance of ambient light of a projection environment, and, the controller is further configured to increase the updated amount of light in response to the luminance of the ambient light being greater than a predetermined luminance level, and to decrease the updated amount of light in response to the luminance of the ambient light being less than the predetermined luminance level.

17. The device of claim 15, wherein the set of lasers or LEDs is configured to produce another amount of light which is greater than the amount of light.

18. The device of claim 15, further comprising a temperature sensor configured to detect a temperature of the set of lasers or LEDs.

19. The device of claim 15, wherein the controller is further configured to determine a subset of the set of lasers or LEDs based on a comparison of a temperature threshold to a temperature of at least one laser or LED in the set of lasers or LEDs, wherein the temperature threshold is a temperature above which longevity failure of a laser or LED of the set of lasers or LEDs due to prolonged use above the temperature occurs.

20. The device of claim 15, wherein the controller is further configured to turn off a laser or LED of the set of lasers or LEDs having a highest temperature among the set of lasers or LEDs.

21. The device of claim 15, further comprising a timer configured to measure a length of time that the set of lasers or LEDs is continuously generating light, wherein the timer triggers a switch to turn off at least one of of the set of lasers or LEDs in response to the length of time being determined to be greater than a defined amount of time.

22. A system, comprising:
means for detecting a luminance of an image projected by a device onto a receiving surface external to the device, wherein the means for detecting luminance is positioned as a function of a difference between a field of view of the means for detecting luminance and an area of the receiving surface on which the image is projected;
means for monitoring a criterion associated with a set of lasers or light emitting diodes (LEDs), wherein the criterion includes the luminance of the projected image on the receiving surface; and
means for selectively adjusting at least a portion of the set of lasers or LEDs based upon a comparison of the criterion to a threshold, wherein the threshold is selected to increase a longevity of the set of lasers or LEDs, and changing the threshold responsive to at least one environmental criterion associated with the system.

23. The system of claim 22, further comprising means for toggling a subset of the set of lasers or LEDs on or off based upon the comparison of the criterion to the threshold.

24. The system of claim 23, wherein the criterion includes a temperature, and the threshold is another temperature above which a longevity failure of a laser or LED of the set of lasers or LEDs due to prolonged use above the temperature occurs.

25. A method, comprising:
producing, by a projection display device comprising a set of lasers, an amount of light from a light source;
detecting, via a luminance sensor, luminance of an image projected by the projection display device onto a receiving surface external to the projection display device, wherein the luminance sensor is positioned as a function of a difference between a field of view of the luminance sensor and an area of the receiving surface on which the image is projected;

monitoring at least one parameter related to the light source, wherein the at least one parameter includes the luminance of the projected image on the receiving surface;

selecting a threshold to increase longevity of the light source;

controlling a subset of the set of lasers as a function of comparing the at least one parameter to the threshold; and altering the threshold based on at least one environmental factor associated with the projection display device.

* * * * *

UNITED STATES PATENT AND TRADEMARK OFFICE
CERTIFICATE OF CORRECTION

PATENT NO. : 8,585,213 B2  
APPLICATION NO. : 12/473704  
DATED : November 19, 2013  
INVENTOR(S) : Plut Page 1 of 1

It is certified that error appears in the above-identified patent and that said Letters Patent is hereby corrected as shown below:

In the Specifications

In Column 9, Line 12, delete "8a" and insert -- 80a --, therefor.

In Column 9, Line 14, delete "8a" and insert -- 80a --, therefor.

In Column 9, Line 22, delete "8a." and insert -- 80a. --, therefor.

In Column 10, Line 6, delete "14a" and insert -- 140a --, therefor.

In Column 10, Line 47, delete "14a-140e," and insert -- 140a-140e, --, therefor.

In Column 10, Lines 59-60, delete "14a-140e," and insert -- 140a-140e, --, therefor.

In Column 11, Lines 17-18, delete "14a-140e." and insert -- 140a-140e. --, therefor.

In Column 11, Line 18, delete "14a" and insert -- 140a --, therefor.

In Column 11, Line 22, delete "14a" and insert -- 140a --, therefor.

In Column 12, Line 13, delete "other wise" and insert -- otherwise --, therefor.

In Column 13, Line 51, delete "40a-e" and insert -- 400a-e --, therefor.

In Column 13, Line 56, delete "40a-e" and insert -- 400a-e --, therefor.

In Column 13, Line 59, delete "40a-e." and insert -- 400a-e. --, therefor.

In Column 13, Line 63, delete "40a-e" and insert -- 400a-e --, therefor.

In the Claims

In Column 20, Line 31, in Claim 21, delete "of of the" and insert -- of the --, therefor.

Signed and Sealed this  
Thirteenth Day of May, 2014

Michelle K. Lee  
*Deputy Director of the United States Patent and Trademark Office*